United States Patent
Park et al.

(10) Patent No.: US 11,251,466 B2
(45) Date of Patent: Feb. 15, 2022

(54) LITHIUM SECONDARY BATTERY INCLUDING ELECTROLYTE CONTAINING TRIALKOXYALKYLSILANE COMPOUND

(71) Applicants: Samsung Electronics Co., Ltd., Suwon-si (KR); Samsung SDI Co., Ltd., Yongin-si (KR)

(72) Inventors: Eunha Park, Seoul (KR); Myongchun Koh, Hwaseong-si (KR); Dongyoung Kim, Yongin-si (KR); Insun Park, Suwon-si (KR); Yeonji Chung, Yongin-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 350 days.

(21) Appl. No.: 16/155,287

(22) Filed: Oct. 9, 2018

(65) Prior Publication Data

US 2019/0288336 A1 Sep. 19, 2019

(30) Foreign Application Priority Data

Mar. 14, 2018 (KR) .................. 10-2018-0029927

(51) Int. Cl.

| | |
|---|---|
| *H01M 10/0567* | (2010.01) |
| *H01M 10/0569* | (2010.01) |
| *H01M 10/0568* | (2010.01) |
| *H01M 10/0525* | (2010.01) |
| *H01M 10/42* | (2006.01) |
| *H01M 4/505* | (2010.01) |
| *H01M 4/587* | (2010.01) |
| *H01M 4/38* | (2006.01) |
| *H01M 4/36* | (2006.01) |
| *H01M 4/525* | (2010.01) |

(52) U.S. Cl.
CPC ....... *H01M 10/0567* (2013.01); *H01M 4/366* (2013.01); *H01M 4/386* (2013.01); *H01M 4/505* (2013.01); *H01M 4/525* (2013.01); *H01M 4/587* (2013.01); *H01M 10/0525* (2013.01); *H01M 10/0568* (2013.01); *H01M 10/0569* (2013.01); *H01M 10/4235* (2013.01)

(58) Field of Classification Search
None
See application file for complete search history.

(56) References Cited

U.S. PATENT DOCUMENTS

| | | | |
|---|---|---|---|
| 8,734,668 B2 | 5/2014 | Bhat et al. | |
| 2008/0233477 A1* | 9/2008 | Takahashi | H01M 4/131 |
| | | | 429/212 |
| 2011/0117446 A1 | 5/2011 | Lucht et al. | |
| 2011/0217010 A1 | 9/2011 | Kachmar | |
| 2014/0295219 A1 | 10/2014 | Bhat et al. | |
| 2017/0117578 A1* | 4/2017 | Seo | H01M 10/0567 |

FOREIGN PATENT DOCUMENTS

| | | | |
|---|---|---|---|
| JP | 2001217010 A | | 8/2001 |
| JP | 2009245922 A | | 10/2009 |
| JP | 6003086 B2 | | 10/2016 |
| JP | 6051537 B2 | | 12/2016 |
| KR | 1020140020328 A | | 2/2014 |
| KR | 1020150045162 A | | 4/2015 |
| KR | 2018-022247 | * | 3/2018 |
| WO | 2006016733 A1 | | 2/2006 |
| WO | 2015032215 A1 | | 3/2015 |
| WO | WO 2015-032215 | * | 3/2015 |

* cited by examiner

Primary Examiner — Laura Weiner
(74) Attorney, Agent, or Firm — Cantor Colburn LLP

(57) ABSTRACT

A lithium secondary battery includes: a positive electrode; an negative electrode; and an electrolyte between the positive electrode and the negative electrode, wherein the positive electrode includes a positive active material represented by Formula 1, the electrolyte includes a lithium salt, a non-aqueous solvent, and a trialkoxyalkylsilane compound represented by Formula 2, and an amount of the trialkoxyalkylsilane compound in the electrolyte is about 0.1 weight percent to about 5 weight percent based on a total weight of the electrolyte:

Formula 1

$Li_xNi_yM_{1-y}O_{2-z}A_z$

Formula 2

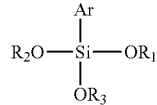

wherein, in Formula 1 and Formula 2, x, y, z, M, A, $R_1$ to $R_3$, and Ar are as defined as the specification.

20 Claims, No Drawings

LITHIUM SECONDARY BATTERY INCLUDING ELECTROLYTE CONTAINING TRIALKOXYALKYLSILANE COMPOUND

CROSS-REFERENCE TO RELATED APPLICATION

This application claims the benefit of and priority to Korean Patent Application No. 10-2018-0029927, filed on Mar. 14, 2018, in the Korean Intellectual Property Office, and all the benefits accruing therefrom under 35 U.S.C. § 119, the disclosure of which is incorporated herein in its entirety by reference.

BACKGROUND

1. Field

The present disclosure relates to a lithium secondary battery including a trialkoxyalkylsilane compound-containing electrolyte.

2. Description of the Related Art

Lithium batteries may be used as power sources for portable electronic devices, such as video cameras, mobile phones, laptop computers, and the like. Rechargeable lithium batteries, i.e., lithium secondary batteries, may have an energy density per unit weight that is three or more times greater than the energy densities per unit weight of lead-acid batteries, nickel-cadmium batteries, nickel-hydrogen batteries, nickel-zinc batteries, and the like. Additionally, lithium secondary batteries may be rapidly charged.

The lithium secondary battery may use a lithium-containing metal oxide as a positive active material included in a positive electrode. For example, a composite oxide of lithium and a metal such as cobalt (Co), manganese (Mn), nickel (Ni), or a combination thereof may be used. Of these metals used in a positive active material, positive active materials containing a higher Ni content (Ni-rich) may provide higher-capacity batteries, as compared to lithium cobalt oxide positive active materials.

When the Ni-rich positive active material is used in the positive active material, the corresponding positive electrode may have a weak surface structure, which may result in poor lifetime characteristics and increased resistance.

The lithium secondary battery further includes a negative electrode that includes a negative active material. Negative active materials of recent interest include compounds and alloys that include silicon (Si), tin (Sn), silicon oxide, or tin oxide, which have the potential for use as high-capacity negative active materials.

However, a lithium secondary battery using, for example, a Si-containing compound or alloy as a negative active material may exhibit reduced capacity due to decomposition of a carbonate compound on the surface of silicon during charging.

Therefore, there remains a need for a lithium secondary battery including a Ni-rich positive active material and a Si-containing negative active material that has a high capacity, excellent lifespan characteristics, and low resistance.

SUMMARY

Provided herein is a lithium secondary battery having a structure wherein a stable solid-electrolyte interphase (SEI) layer may be formed on the surface of a positive active material during charging of the lithium secondary battery.

Additional aspects will be set forth in part in the description which follows and, in part, will be apparent from the description, or may be learned by practice of the presented embodiments.

According to an aspect of an embodiment, a lithium secondary battery includes: a positive electrode; a negative electrode; and an electrolyte between the positive electrode and the negative electrode, wherein the positive electrode includes a positive active material represented by Formula 1, the electrolyte includes a lithium salt, a non-aqueous solvent, and a trialkoxyalkylsilane compound represented by Formula 2, and an amount of the trialkoxyalkylsilane compound is about 0.1 wt % to about 5 wt % based on a total weight of the electrolyte:

Formula 1

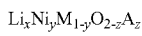

Formula 2

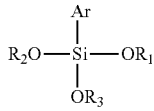

wherein, in Formula 1,
0.9≤x≤1.2, 0.8≤y≤0.95, and 0≤z<0.2;
M is at least one of Al, Mg, Mn, Co, Fe, Cr, V, Ti, Cu, B, Ca, Zn, Zr, Nb, Mo, Sr, Sb, W, and Bi; and
A is an element having an oxidation number of −1 or −2, and
in Formula 2,
$R_1$ to $R_3$ are each independently a substituted or unsubstituted $C_1$-$C_{30}$ alkyl group;
Ar is a substituted or unsubstituted $C_3$-$C_{30}$ alkyl group, a substituted or unsubstituted $C_3$-$C_{60}$ cycloalkyl group, or a substituted or unsubstituted $C_6$-$C_{60}$ aryl group; and a substituent of the substituted $C_1$-$C_{30}$ alkyl group, the substituted $C_3$-$C_{30}$ alkyl group, the substituted $C_3$-$C_{60}$ cycloalkyl group, or the substituted $C_6$-$C_{60}$ aryl group is a halogen, a methyl group, an ethyl group, a propyl group, an isopropyl group, an n-butyl group, an isobutyl group, a t-butyl group, a trifluoromethyl group, a tetrafluoroethyl group, a vinyl group, a propenyl group, or a butenyl group.

DETAILED DESCRIPTION

Reference will now be made in detail to embodiments. In this regard, the present embodiments may have different forms and should not be construed as being limited to the descriptions set forth herein. Accordingly, the embodiments are merely described below to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the FIGURES. It will be understood that relative terms are intended to encompass different orientations of the device in addition to the orientation depicted in the FIGURES. For example, if the device in one of the FIGURES is turned over, elements described as being on the "lower" side of other elements would then be oriented on "upper" sides of the other elements. The exemplary term "lower," can therefore, encompasses both an orientation of "lower" and "upper," depending on the particular orientation of the FIGURE. Similarly, if the device in one of the FIGURES is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Throughout the specification, the terms a and b of "$C_a$-$C_b$" used in formulae refer to the numbers of carbon atoms of a functional group. That is, the functional group may include from the number of a carbon atoms to the number of b of carbon atoms. For example, "$C_1$-$C_4$ alkyl group" refers to an alkyl group having 1 to 4 carbon atoms, i.e., $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, and $(CH_3)_3C$—.

Throughout the specification, a substituent as used in the formulae means a group or compound wherein at least one hydrogen atom thereof is substituted with another atom or group. Unless otherwise stated, the term "substituted" refers to a compound or radical substituted with at least one of a halogen atom (e.g., $F^-$, $Cl^-$, $Br^-$, $I^-$), a $C_1$-$C_{20}$ alkyl group substituted with a halogen atom (e.g., $CCF_3$, $CHCF_2$, $CH_2F$, and $CCl_3$), a hydroxyl group, a nitro group, a cyano group, an amino group, an amidino group, a hydrazine group, a hydrazone group, a carbonyl group (C=O), a carboxylic acid group (C(=O)OH) or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_7$-$C_{20}$ arylalkyl group, a $C_3$-$C_{20}$ heteroaryl group, a $C_3$-$C_{20}$ heteroarylalkyl group, a $C_3$-$C_{20}$ cycloalkyl group, a $C_3$-$C_{15}$ cycloalkenyl group, a $C_6$-$C_{15}$ cycloalkynyl group, a $C_5$-$C_{15}$ heterocycloalkyl group, or a combination including at least one of the foregoing.

As used herein, when a definition is not otherwise provided, the term "hetero" refers to a compound or group including one to three heteroatoms that are N, O, S, P, and/or Si.

As used herein, when a definition is not otherwise provided, the term "alkyl group" refers to a group derived from a straight or branched chain saturated aliphatic hydrocarbon having the specified number of carbon atoms and having a valence of at least one.

As used herein, when a definition is not otherwise provided, the term "alkenyl group" refers to a straight or branched chain, monovalent hydrocarbon group having at least one carbon-carbon double bond.

As used herein, when a definition is not otherwise provided, the term "alkynyl group" refers to a straight or branched chain, monovalent hydrocarbon group having at least one carbon-carbon triple bond.

As used herein, when a definition is not otherwise provided, an alkyl group, an alkenyl group, or an alkynyl group may be linear or branched. Specific examples of the alkyl group may be a methyl group, an ethyl group, an isopropyl group, a tert-butyl group, an n-octyl group, an n-decyl group, an n-hexadecyl group, and the like. Specific examples of the alkenyl group may be a vinyl group, an allyl group, a 2-butenyl group, a 3-pentenyl group, and the like. Specific examples of the alkynyl group may be a propargyl group, a 3-pentynyl group, and the like.

As used herein, when a definition is not otherwise provided, the term "alkoxy group" refers to "alkyl-O—", wherein the term "alkyl" has the same meaning as described above.

As used herein, when a definition is not otherwise provided, the term "cycloalkyl group" refers to a monovalent group having one or more saturated rings in which all ring members are carbon.

As used herein, when a definition is not otherwise provided, the term "aryl", which is used alone or in combination, refers to an aromatic hydrocarbon containing at least one ring and having the specified number of carbon atoms. The term "aryl" may be construed as including a group with an aromatic ring fused to at least one cycloalkyl ring.

As used herein, when a definition is not otherwise provided, the term "arylalkyl" refers to an alkyl group substituted with an aryl group.

As used herein, when a definition is not otherwise provided, the term "heteroaryl" refers to a functional group obtained by removal of a hydrogen from an aromatic ring, containing one to three heteroatoms selected from the group consisting of N, O, S, Si, and P as ring-forming elements, and optionally substituted with one or more substituents where indicated.

As used herein, when a definition is not otherwise provided, the term "heteroarylalkyl" refers to an alkyl group substituted with a heteroaryl group.

As used herein, the terms "alkylene", "cycloalkylene", "arylene", and "heteroarylene" refer to a divalent group respectively derived from an alkyl group, a cycloalkyl group, an aryl group, and a heteroaryl group as defined above.

As used herein, when a definition is not otherwise provided, the term "amine group" refers to group having formula NRR' wherein R and R' are independently hydrogen, a C1 to C20 alkyl group, or a C6 to C30 aryl group.

A C rate means a current which will discharge a battery in one hour, e.g., a C rate for a battery having a discharge capacity of 1.6 ampere-hours would be 1.6 amperes.

Hereinafter, a lithium secondary battery according to one or more embodiments will be described in greater detail.

In accordance with an aspect of the disclosure, a lithium secondary battery includes: a positive electrode; a negative electrode; and an electrolyte between the positive electrode and the negative electrode, wherein the positive electrode includes a positive active material represented by Formula 1, the electrolyte includes a lithium salt, a non-aqueous solvent, and a trialkoxyalkylsilane compound represented by Formula 2, and an amount of the trialkoxyalkylsilane compound is about 0.1 weight percent (wt %) to about 5 wt % based on a total weight of the electrolyte:

Formula 1

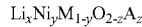

Formula 2

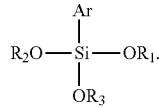

In Formula 1, 0.9≤x≤1.2, 0.8≤y≤0.95, and 0≤z<0.2; M may be at least one of Al, Mg, Mn, Co, Fe, Cr, V, Ti, Cu, B, Ca, Zn, Zr, Nb, Mo, Sr, Sb, W, and Bi; and A may be an element having an oxidation number of −1 or −2.

In Formula 2, $R_1$ to $R_3$ may each independently be a substituted or unsubstituted $C_1$-$C_{30}$ alkyl group; Ar may be a substituted or unsubstituted $C_3$-$C_{30}$ alkyl group, a substituted or unsubstituted $C_3$-$C_{60}$ cycloalkyl group, or a substituted or unsubstituted $C_6$-$C_{60}$ aryl group; and a substituent of the substituted $C_1$-$C_{30}$ alkyl group, the substituted $C_3$-$C_{30}$ alkyl group, the substituted $C_3$-$C_{60}$ cycloalkyl group, or the substituted $C_6$-$C_{60}$ aryl group may be a halogen atom, a methyl group, an ethyl group, a propyl group, an isopropyl group, an n-butyl group, an isobutyl group, a t-butyl group, a trifluoromethyl group, a tetrafluoroethyl group, a vinyl group, a propenyl group, or a butenyl group.

Although a Ni-rich lithium metal composite oxide such as the positive active material represented by Formula 1 may advantageously be used to implement a high-capacity battery, $Ni^{2+}$ cations may be released from the positive electrode into the electrolyte and react with a solid-electrolyte interphase (SEI) layer of the negative electrode, thus decomposing the SEI layer. This may cause the negative active material to be partially exposed to the electrolyte, leading to a side reaction and consequential deterioration of capacity and lifespan characteristics and increase in resistance. To address these drawbacks, the lithium secondary battery according to one or more embodiments uses an electrolyte including the trialkoxyalkylsilane compound represented by Formula 2. The trialkoxyalkylsilane compound may react with the $Ni^{2+}$ cations released into the electrolyte to stabilize the $Ni^{2+}$ cations, thereby reducing resistance. In addition, the addition of the trialkoxyalkylsilane compound may improve stability of the SEI layer, and thus, deterioration of capacity and lifespan characteristics of the lithium secondary battery may be prevented.

In a lithium secondary battery using a Si composite as a negative active material, due to decomposition of a carbonate compound on the Si surface during charging, the lithium secondary battery may have reduced capacity. To address this drawback, the present disclosure provides including a predetermined amount of the trialkoxyalkylsilane compound of Formula 2 in the electrolyte, wherein the trialkoxyalkylsilane compound may form a stable SEI layer on surfaces of Si particles during charging of a lithium secondary battery, consequently improving the stability and durability of the Si composite.

The amount of the trialkoxyalkylsilane compound in the electrolyte may be about 0.1 weight percent (wt %) to about 5 wt % based on a total weight of the electrolyte. However, embodiments are not limited thereto. The amount of the trialkoxyalkylsilane compound may be within any range that may stabilize $Ni^{2+}$ ions released from the positive active material into the electrolyte and stabilize the surfaces of Si particles. When the amount of the trialkoxyalkylsilane compound within the above range, stability and durability of the SEI layer of the negative electrode may be improved, consequently leading to improved lifetime characteristics, low resistance, and high-capacity characteristics.

For example, the amount of the trialkoxyalkylsilane compound may be about 0.1 wt % or greater to about 4 wt % or less, and in some embodiments, 0.1 wt % or greater to about 3 wt % or less, and in some other embodiments, 0.1 wt % or greater to less than 3 wt %, and in some other embodiments, 0.3 wt % or greater to less than 3 wt %, and in some other embodiments, 0.3 wt % or greater to 2 wt % or less, and in some other embodiments, 0.5 wt % or greater to about 2 wt % or less, and in some other embodiments, 0.5 wt % or greater to about 1.5 wt % or less, each based on a total weight of the electrolyte.

In the trialkoxyalkylsilane compound represented by Formula 2, $R_1$ to $R_3$ may each independently be a substituted or unsubstituted $C_1$-$C_{30}$ alkyl group.

For example, $R_1$ to $R_3$ may be the same or differ from each other.

For example, the $C_1$-$C_{30}$ alkyl group may be a methyl group, an ethyl group, a propyl group, an isopropyl group, a butyl group, or a tert-butyl group. However, embodiments are not limited thereto.

In the trialkoxyalkylsilane compound represented by Formula 2, Ar may be a substituted or unsubstituted $C_3$-$C_{30}$ alkyl group, a substituted or unsubstituted $C_3$-$C_{60}$ cycloalkyl group, and a substituted or unsubstituted $C_6$-$C_{60}$ aryl group.

For example, Ar may be a fluorine-substituted $C_3$-$C_{30}$ alkyl group

For example, Ar may be a propyl group, an isopropyl group, a n-butyl group, an isobutyl group, a sec-butyl group, a tert-butyl group, a pentyl group, a hexyl group, a cyclopentyl group, a cyclohexyl group, or a phenyl group.

The trialkoxyalkylsilane compound may be a compound represented by one of Formulae 2-1 to 2-6. However, embodiments are not limited thereto.

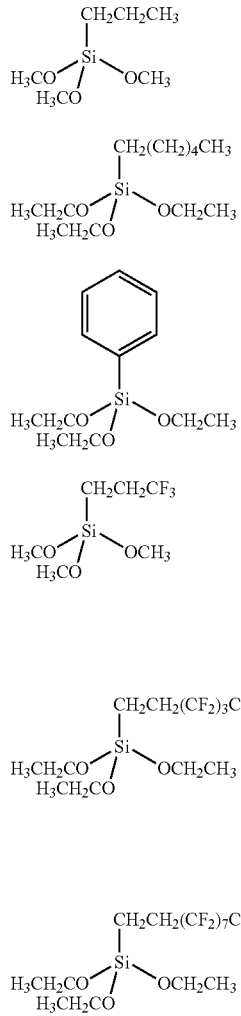

In one or more embodiments, the electrolyte may include a lithium salt. The lithium salt may serve as a source of lithium ions in the battery by being dissolved in an organic solvent. For example, the lithium salt may facilitate migration of lithium ions between the positive electrode and the negative electrode.

Anions of the lithium salt in the electrolyte may be at least one selected from the group consisting of $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (wherein x may be a natural number), $(C_xF_{2x+1}SO_2)(C_yF_{2y+1}SO_2)N^-$ (wherein x and y may be natural numbers), and a halide.

For example, the lithium salt may be lithium difluoro (oxalato)borate (LiDFOB), lithium bis(oxalato)borate (LiBOB), lithium difluoro bis(oxalato)phosphate (LiDFOP), $LiBF_4$, $LiPF_6$, $LiCF_3SO_3$, $(CF_3SO_2)_2NLi$, $(FSO_2)_2NLi$, or a combination thereof. For example, the lithium salt may be LiDFOB or $LiPF_6$.

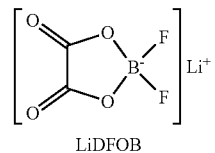

LiDFOB

At least one of the above-listed lithium salts may be used in combination. In one or more embodiments, the lithium salt may include, for example, about 0.6M to 2.0M $LiPF_6$ as a main salt, and at least one other salt that is LiDFOB, LiBOB, LiDFOP, $LiBF_4$, $LiPF_6$, $LiCF_3SO_3$, $(CF_3SO_2)_2NLi$, or $(FSO_2)_2Ni$ in an amount not exceeding the amount of the main salt.

In one or more embodiments, the lithium salt may include, about 1M to about 1.5M of $LiPF_6$, and about 0.5 wt % to about 10 wt % of at least one of LiDFOB, LiBOB, LiDFOP, $LiBF_4$, $LiPF_6$, $LiCF_3SO_3$, $(CF_3SO_2)_2NLi$, and $(FSO_2)_2Ni$ based on a total weight of the electrolyte. However, the amount of the lithium salt is not limited to this range. Any suitable amount of the lithium salt that enables effective migration of lithium ions and/or electrons in the electrolyte during charging and discharging may be used.

The non-aqueous solvent in the electrolyte may serve as a migration medium of ions during charging and discharging of the lithium secondary battery. The non-aqueous solvent may be a carbonate solvent, an ester solvent, an ether solvent, a ketone solvent, an aprotic solvent, and a combination thereof. For example, the carbonate solvent may be dimethyl carbonate (DMC), diethyl carbonate (DEC), ethyl methyl carbonate (EMC), dipropyl carbonate (DPC), methylpropyl carbonate (MPC), ethylpropyl carbonate (EPC), methyl ethyl carbonate (MEC), ethylene carbonate (EC), propylene carbonate (PC), butylene carbonate (BC), or tetraethylene glycol dimethyl ether (TEGDME). For example, the ester solvent may be methyl acetate, ethyl acetate, n-propyl acetate, dimethyl acetate, methyl propionate, ethyl propionate, γ-butyrolactone (GBL), decanolide, valerolactone, mevalonolactone, or caprolactone. For example, the ether solvent may be dibutyl ether, tetraglyme, diglyme, dimethoxyethane, 2-methyltetrahydrofuran, or tetrahydrofuran. For example, the ketone solvent may be cyclohexanone.

The above-listed non-aqueous solvents may be used alone or in a combination of at least two thereof. When at least two of the non-aqueous solvents are used, a mixing ratio of the at least two solvents may be appropriately adjusted according to battery performance. This will be understood by one of ordinary skill in the art.

In one or more embodiments, the carbonate solvent may be a mixed solvent of a linear carbonate and a cyclic carbonate. When the linear carbonate and the cyclic carbonate are mixed in a volume ratio of about 1:1 to about 9:1, the electrolyte may exhibit excellent performance.

In one or more embodiments, to form a stable SEI layer on a surface of the negative electrode during charging and discharging of the lithium secondary battery, the non-aqueous solvent may further include a fluoroethylene carbonate (FEC), vinylene carbonate (VC), vinylethylene carbonate (VEC), a phosphorous (P)-containing compound, and a sulfur (S)-containing compound.

For example, the non-aqueous solvent may further include fluoroethylene carbonate (FEC). For example, the lithium secondary battery may include about 0.1 wt % to about 20 wt % of FEC based on a total weight of the non-aqueous solvent. For example, the lithium secondary battery may include about 0.1 wt % to about 10 wt % of FEC based on a total weight of the non-aqueous solvent. For example, the lithium secondary battery may include about 0.1 wt % to about 5 wt % of FEC based on a total weight of the non-aqueous solvent. For example, the lithium secondary battery may further include about 2 wt % to about 4 wt % based on a total weight of the non-aqueous solvent. When the amount of FEC in the non-aqueous solvent is within these ranges, an effective SEI layer that does not hinder diffusion rate of lithium ions may be rapidly formed. Due to the inclusion of the trialkoxyalkylsilane compound, in addition to the FEC in the non-aqueous solvent, a coating layer including the trialkoxyalkylsilane compound may also be formed on the SEI layer while the effective SEI layer is formed on the surface of the negative electrode. Accordingly, durability of the SEI layer may be improved, and a capacity reduction caused by loss of the negative active material (for example, Si) may be prevented.

The electrolyte may include a carbonate including a carbon-carbon single or multiple bonds, a carboxylic anhydride including a carbon-carbon double bond or multiple bonds, or a combination thereof. The multiple bonds may include a double bond or a triple bond. The carbonate and the carboxylic anhydride may be linear or cyclic.

In order to form a stable SEI layer on the surface of the negative electrode during charging and discharging of the lithium secondary battery, the electrolyte may further include vinylene carbonate (VC), vinyl ethylene carbonate (VEC), a maleic anhydride, a succinic anhydride, or a combination thereof. For example, the lithium secondary battery may further include VC, VEC, a maleic anhydride, a succinic anhydride, or a combination thereof in an amount of about 0.1 wt % to about 2 wt %, and in some other embodiments, about 0.1 wt % to about 1.5 wt %, based on a total weight of the electrolyte.

For example, the lithium secondary battery may further include VC, a maleic anhydride, or a combination thereof in an amount of about 0.1 wt % to about 2 wt %, and in some embodiments, about 0.1 wt % to about 1.5 wt %, based on a total weight of the electrolyte.

In one or more embodiments, the electrolyte may further include a maleic anhydride. However, embodiments are not limited thereto. For example, the lithium secondary battery may further include a maleic anhydride in an amount of about 0.1 wt % to about 1.5 wt %, and in some embodiments, about 0.1 wt % to about 1.0 wt %, and in some other embodiments, about 0.1 wt % to about 0.5 wt %, based on a total weight of the electrolyte.

In one or more embodiments, the electrolyte may further include a phosphorous (P)-containing compound, a sulfur (S)-containing compound, or a combination thereof. For example, the electrolyte may further include a phosphorous (P)-containing compound, a sulfur (S)-containing compound, or a combination thereof in an amount of about 0.1 wt % or greater to about 3 wt % or less, and in some embodiments, about 0.1 wt % or greater to about 2 wt % or less, and in some other embodiments, about 0.5 wt % or greater to about 2 wt % or less, each based on a total weight of the electrolyte.

The P-containing compound may be at least one of a phosphine compound and a phosphate compound. The S-containing compound may be a sulfone compound, a sulfonate compound, a disulfonate compound, or a combination thereof.

The phosphine compound may be, for example, triphenylphosphine, tris(o-tolyl)phosphine, or tris(butyl)phosphine. However, embodiments are not limited thereto. For example, the phosphate compound may be trimethylphosphate, triethylphosphate, tripropylphosphate, or tributylphosphate. However, embodiments are not limited thereto.

The sulfone compound may be, for example, ethylmethyl sulfone, bisphenyl sulfone, divinyl sulfone, or tetramethylene sulfone. However, embodiments are not limited thereto. For example, the sulfonate compound may be methyl methane sulfonate, ethyl methane sulfonate, or diallyl sulfonate. However, embodiments are not limited thereto. The disulfonate compound may be, for example, methylene methane disulfonate (MMDS), busulfan, tosyloxydisulfonate, or methylene bis(methansulfonate). However, embodiments are not limited thereto.

Hereinafter, other configurations of the lithium secondary battery according to one or more embodiments will be described in detail.

The positive electrode may include a positive active material represented by Formula 1. For example, in Formula 1, A may be one of a halogen, S, and N. However, embodiments are not limited thereto.

In Formula 1, y, which indicates an amount of Ni in the positive active material, may satisfy that $0.8 \le y \le 0.95$, and in some embodiments, $0.85 \le y \le 0.95$. When the amount of Ni in the positive active material is less than 80%, the amount of Ni may be so small that the positive electrode may have a stable surface structure, and deterioration caused by the release of $Ni^{3+}$ cations from the positive electrode or a disproportionation reaction, which may occur in a Ni-rich positive active material, may be less likely to occur. Furthermore, due to adhesion of a phosphite compound, which has an affinity to $Ni^{3+}$ cations, to the surface of the positive electrode, lifespan characteristics may deteriorate, and resistance may be increased.

For example, the positive active material may be represented by Formula 3 or Formula 4.

$$Li_{x'}Ni_{y'}Co_{1-y'-z'}Al_{z'}O_2 \quad \text{Formula 3}$$

$$Li_{x'}Ni_{y'}Co_{1-y'-z'}Mn_{z'}O_2 \quad \text{Formula 4}$$

In Formula 3 and Formula 4, $0.9 \le x' \le 1.2$, $0.8 \le y' \le 0.95$, $0 < z' < 0.1$, and $0 < 1-y'-z' < 0.2$.

For example, the positive electrode may include at least one positive active material that is $Li_{1.02}Ni_{0.85}Co_{0.1}Mn_{0.05}O_2$, $Li_{1.02}Ni_{0.88}Co_{0.08}Mn_{0.04}O_2$, $Li_{1.02}Ni_{0.88}Co_{0.08}Al_{0.04}O_2$, $LiNi_{0.8}Co_{0.15}Al_{0.05}O_2$, $LiNi_{0.88}Co_{0.1}Al_{0.02}O_2$, $LiNi_{0.85}Co_{0.1}Al_{0.05}O_2$, $LiNi_{0.8}Co_{0.15}Mn_{0.05}O_2$, $LiNi_{0.88}Co_{0.1}Mn_{0.02}O_2$, $LiNi_{0.85}Co_{0.1}Mn_{0.05}O_2$, $Li_{1.02}Ni_{0.95}Co_{0.025}Mn_{0.025}O_2$, or $Li_{1.02}Ni_{0.95}Co_{0.025}Al_{0.025}O_2$. For example, the positive electrode may include at least one positive active material that is $Li_{1.02}Ni_{0.80}Co_{0.15}Mn_{0.05}O_2$, $Li_{0.02}Ni_{0.85}Co_{0.10}Mn_{0.05}O_2$, $Li_{1.02}Ni_{0.88}Co_{0.10}Mn_{0.02}O_2$, or $Li_{1.02}Ni_{0.95}Co_{0.025}Mn_{0.025}O_2$. However, embodiments are not limited thereto.

In one or more embodiments, the positive electrode may further include, in addition to the above-listed positive active materials, at least one of lithium cobalt oxide, lithium nickel cobalt manganese oxide, lithium nickel cobalt aluminum oxide, lithium iron phosphate, and lithium manganese oxide. However, embodiments are not limited thereto. The positive electrode may further include any common positive active material available in the art.

For example, the positive electrode may further include a compound represented by one of the following formulae: $Li_aA_{1-b}B'_bD_2$ (wherein $0.90 \le a \le 1.8$, and $0 \le b \le 0.5$); $Li_a$ $E_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A may be Ni, Co, Mn, or a combination thereof; B' may be Al, Ni, Co, Mn, Cr, Fe, Mg, Sr, V, a rare earth element, or a combination thereof; D may be O, F, S, P, or a combination thereof; E may be Co, Mn, or a combination thereof; F' may be F, S, P, or a combination thereof; G may be Al, Cr, Mn, Fe, Mg, La, Ce, Sr, V, or a combination thereof; Q may be Ti, Mo, Mn, or a combination thereof; I' may be Cr, V, Fe, Sc, Y, or a combination thereof; and J may be V, Cr, Mn, Co, Ni, Cu, or a combination thereof.

For example, the positive electrode of the lithium secondary battery according to one or more embodiments may be manufactured according to the following method.

The positive electrode may be manufactured by coating, drying, and then pressing a positive active material onto a positive electrode current collector. A positive active material composition may be prepared as a combination of such a positive active material as described above, a binder, and a solvent as needed.

For example, a conducting agent, a filler, or the like may be further added to the positive active material composition. The positive active material composition may be directly coated on the positive electrode current collector and then dried to form a positive electrode in a form of plate. In some other embodiments, the positive active material composition may be cast on a separate support to form a positive active material film. This positive active material film may then be separated from the support and then laminated on the positive electrode current collector, to thereby form the positive electrode in a form of plate.

For example, a loading level of the prepared positive active material composition may be about 30 milligrams per square centimeter (mg/cm$^2$) or greater, and in some embodiments, about 35 mg/cm$^2$ or greater, and in some other embodiments, about 40 mg/cm$^2$ or greater. For example, the positive electrode may have an electrode density of about 3 grams per cubic centimeter (g/cc) or greater, and in some embodiments, about 3.5 g/cc or greater.

In one or more embodiments, to obtain an increased cell energy density, the loading level of the positive active material composition may be about 30 mg/cm$^2$ or greater to about 50 mg/cm$^2$ or less, and the electrode density of the positive electrode may be about 3.5 g/cc or greater to about 4.2 g/cc or less.

When the loading level of the positive active material composition and the electrode density are within the above-described ranges, a lithium secondary battery including the positive active material may have an increased cell volumetric energy density of, for example, about 500 watt hours per liter (Wh/L) or greater, and in some embodiments, about 500 Wh/L or greater to about 900 Wh/L or less.

The solvent may be, for example, N-methylpyrrolidone (NMP), acetone, or water. The amount of the solvent may be about 10 parts to about 100 parts by weight based on 100 parts by weight of the positive active material. When the amount of the solvent is within this range, forming the positive active material film may be facilitated.

In general, the conducting agent may be added in an amount of about 1 wt % to about 30 wt % based on a total weight of positive active material composition including the positive active material. The conducting agent may be any material having conductivity, not causing a chemical change in the lithium secondary battery. Non-limiting examples of the conducting agent may include graphite such as natural graphite or artificial graphite; carbonaceous materials such as carbon black, acetylene black, Ketjen black, channel black, furnace black, lamp black, or summer black; conductive fibers, such as carbon fibers or metal fibers; carbon fluoride; metal powders, such as aluminum or nickel powder; conductive whiskers, such as zinc oxide or potassium titanate; a conductive metal oxide, such as a titanium oxide; and a conductive material, such as a polyphenylene derivative.

The binder may facilitate binding between the positive active material and the conducting agent, and binding to the current collector. For example, the amount of the binder may be about 1 wt % to about 30 wt % based on a total weight of the positive active material composition. Non-limiting examples of the binder may be polyvinylidene fluoride (PVdF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenylene sulfide, polyamide imide, polyether imide, polyethylene sulfone, polyamide, polyacetal, polyphenylene oxide, polybutylene terephthalate, an ethylene-propylene-diene monomer (EPDM), sulfonated EPDM, styrene-butadiene rubber (SBR), fluoro rubber, gum arabic (GA), copolymers thereof, and a combination thereof.

The filler may inhibit expansion of the positive electrode. The filler may be optional. The filler may be any fibrous material not causing a chemical change in the lithium secondary battery. However, embodiments are not limited thereto. For example, the filler may be an olefin-based polymer such as polyethylene or polypropylene; or a fibrous material such as glass fiber, carbon fiber, or the like.

The amounts of the positive active material, the conducting agent, the filler, the binder, and the solvent may be the same as amounts commonly used in lithium secondary batteries. At least one of the conducting agent, the filler, the binder, and the solvent may be omitted depending on the use and structure of the lithium secondary battery.

For example, N-methylpyrrolidone (NMP) may be used as the solvent, PVdF or a PVdF copolymer may be used as the binder, and carbon black or acetylene black may be used as the conducting agent. For example, after about 94 wt % of the positive active material, about 3 wt % of the binder, and about 3 wt % of the conducting agent are mixed together to obtain a mixture in power form, NMP may be added to the mixture to prepare a slurry having a solid content of about 70 wt %. This slurry may then be coated, dried, and roll-pressed, to thereby manufacture a positive electrode plate.

The positive electrode current collector may have a thickness of about 3 micrometers (μm) to about 50 μm. The positive electrode current collector is not particularly limited, and may be any material having a high conductivity and not causing chemical changes in the battery. For example, the positive electrode current collector may be stainless steel, aluminum, nickel, titanium, sintered carbon, or aluminum or stainless steel that is surface-treated with carbon, nickel, titanium, or silver. For example, the positive electrode current collector may be processed to have an uneven surface with fine projections and recesses to enhance the adhesion of the positive active material to the surface of the positive electrode current collector. The positive electrode current collector may be in any of various forms, including a film, a sheet, a foil, a net, a porous structure, a foam, and a non-woven fabric.

For example, the negative electrode of the lithium secondary battery according to one or more embodiments may include a negative active material containing a metal that is alloyable with lithium, and/or a carbonaceous negative active material.

For example, the negative active material containing a metal that is alloyable with lithium may include at least one of silicon (Si), a silicon-carbon (Si—C) composite material including Si particles, and a silicon oxide ($SiO_{a'}$, wherein $0<a'<2$).

In one or more embodiments, the Si particles in the silicon-carbon composite material may have an average particle diameter of about 200 nanometers (nm) or less. For example, the Si particles in the silicon-carbon composite material may have an average particle diameter of about 10 nm to about 150 nm, and in some embodiments, about 10 nm to about 100 nm.

When the average particle diameter of the Si particles in the silicon-carbon composite material is within these ranges, a lithium secondary battery using the silicon-carbon composite material may have improved capacity retention.

In one or more embodiments, the silicon-carbon composite material may have an average particle diameter of about 20 μm or less. For example, the silicon-carbon composite material may have an average particle diameter of about 5 μm to about 20 μm, and in some embodiments, an average particle diameter of about 10 μm to about 15 μm.

When the average particle diameter of the silicon-carbon composite material is within these ranges, a lithium secondary battery using the silicon-carbon composite material may have improved capacity retention.

In one or more embodiments, the silicon-carbon composite material may have a specific capacity of about 600 milliampere hours per gram (mAh/g) to about 2000 mAh/g. For example, the silicon-carbon composite material may have a specific capacity of about 800 mAh/g to about 1600 mAh/g.

The silicon oxide $SiO_{a'}$ or the silicon-carbon composite material may be used as a combination with a carbonaceous material. For example, using a combination of about 12 wt % of a Si—C composite having a specific capacity of about 1300 mAh/g, about 85 wt % of graphite, and about 3 wt % of a binder, a negative electrode having a specific capacity of about 500 mAh/g may be formed. This negative electrode may provide improved battery performance, relative to when a $SiO_{a'}$ or Si—C composite material having a specific capacity of about 500 mAh/g is used.

In one or more embodiments, the carbonaceous negative active material may include graphite.

In addition to the above-described negative active materials, the negative electrode may further include Sn, Al, Ge, Pb, Bi, Sb, an Si—Y' alloy (wherein Y' may be an alkaline metal, an alkaline earth metal, a Group 13 element, a Group 14 element, a transition metal, a rare earth element, or a combination thereof, but may be not Si), an Sn—Y' alloy (wherein Y' may be an alkaline metal, an alkaline earth metal, a Group 13 element, a Group 14 element, a transition metal, a rare earth element, or a combination thereof, but may be not Sn). The element Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

The negative electrode of the lithium secondary battery according to one or more embodiments may be manufactured according to the following method.

The negative electrode may be manufactured by coating, drying, and then pressing a negative active material composition onto a negative electrode current collector. The negative active material composition may be prepared as a mixture of a negative active material as described above with a binder and a solvent as needed.

For example, a conducting agent, a filler, or the like may be further added to the negative active material composition. The binder, the solvent, the conducting agent, and the filler used in the negative active material composition may be the same as those used in the above-described positive active material composition.

In some embodiments, the negative active material composition may use water as a solvent. For example, the negative active material composition may include water as a solvent; carboxymethyl cellulose (CMC), styrene-butadiene rubber (SBR), an acrylate polymer, a methacrylate polymer, or gum arabic (GA) binder as a binder; and carbon black, acetylene black, or graphite as a conducting agent. For example, after about 94 wt % of a negative active material including a Si—C composite material and graphite, about 3 wt % of the binder, and about 3 wt % of the conducting agent are mixed together to obtain a mixture in powder form, water may be added to the mixture such as to prepare a slurry having a solid content of about 70 wt %. This slurry may then be coated, dried, and roll-pressed, to thereby manufacture a negative electrode in a form of plate.

A loading level of the negative active material composition may be determined according to the loading level of the positive active material composition.

For example, a loading level of the negative active material composition may be about 12 $mg/cm^2$ or greater, and in some embodiments, about 14 $mg/cm^2$ or greater, depending on the capacity per gram of the negative active material composition. For example, the negative electrode may have an electrode density of about 1.5 g/cc or greater, and in some embodiments, about 1.6 g/cc or greater.

The capacity per gram may be controlled by adjusting a mixing ratio of the Si—C composite material and the graphite. Using a combination of about 84 wt % of graphite having a specific capacity of about 360 mAh/g, about 14 wt % of the Si—C composite material having a specific capacity of about 1300 mAh/g, and about 2 wt % of a binder, the negative electrode may have a specific capacity of about 500 mAh/g. In some embodiments, when a combination of the Si—C composite material and the silicon oxide ($SiO_a$) is used, the negative electrode may have a specific capacity of about 380 mAh/g to about 800 mAh/g. When the specific capacity of the negative electrode is less than 380 mAh/g, an expected effect of the combination may not be obtained. On the other hand, when the specific capacity of the negative electrode exceeds 800 mAh/g, a significant reduction in capacity retention may occur.

In one or more embodiments, to attain a high cell energy density, a loading level of the negative active material composition may be about 15 mg/cm$^2$ to about 25 mg/cm$^2$, and an electrode density of the negative electrode may be about 1.6 g/cc to about 2.3 g/cc.

When a loading level of the negative active material and an energy density of the negative electrode are within the above ranges, a lithium secondary battery including such a negative active material may exhibit a high cell volumetric energy density of about 500 Wh/L or greater.

The negative electrode current collector may have a thickness of about 3 μm to about 50 μm. The negative electrode current collector is not particularly limited, and may be any material having suitable conductivity, not causing chemical changes in the battery. For example, the negative electrode current collector may be copper; stainless steel; aluminum; nickel; titanium; sintered carbon; copper or stainless steel that is surface-treated with carbon, nickel, titanium, or silver; or an aluminum-cadmium alloy. Similar to the positive electrode current collector, the negative electrode current collector may be processed to have an uneven surface with fine projections and recesses to enhance the adhesion of the negative active material to the surface of the negative electrode current collector. The negative electrode current collector may be in any of various forms, including a film, a sheet, a foil, a net, a porous structure, a foam, and a non-woven fabric.

In one or more embodiments, the lithium secondary battery may exhibit a direct current internal resistance (DCIR) increase rate of about 150% or less after 200 cycles of charging and discharging at a temperature of about 25° C. under a charge current of 0.5 C and a discharge current of 1 C, an operating voltage of about 2.8 volts (V, vs. Li) to about 4.25 V, and a cut-off current of 1/10 C in a constant current-constant voltage (CC-CV) mode.

That is, the lithium secondary battery according to one or more embodiments may have a significantly reduced DCIR increase rate and improved battery characteristics, compared to a high-Ni lithium secondary battery of the related art.

For example, an operating voltage of the lithium secondary battery may be from about 2.8 V to about 4.3 V.

For example, the lithium secondary battery may have a volumetric energy density of about 500 Wh/L or greater.

In one or more embodiments, the lithium secondary battery may further include a separator between the positive electrode and the negative electrode. The separator may be an insulating thin film having a high ion permeability and strong mechanical intensity. The separator may have a pore diameter of about 0.001 μm to about 1 μm, and a thickness of about 3 μm to about 30 μm. The separator may be, for example, an olefin-based polymer such as polypropylene or the like having resistance to chemicals and hydrophobic characteristics; or a sheet or non-woven fabric made of glass fiber, polyethylene, or the like. When a solid electrolyte, for example, a polymer electrolyte, is used, the solid electrolyte may also serve as the separator.

In one or more embodiments, in addition to the above-described electrolytes, the electrolyte may further include a solid electrolyte, an organic solid electrolyte, or an inorganic solid electrolyte.

The organic solid electrolyte may be, for example, a polyethylene derivative, a polyethylene oxide derivative, a polypropylene oxide derivative, a phosphoric acid ester polymer, polyester sulfide, polyvinyl alcohol, polyvinylidene fluoride, and a polymer including an ionic dissociation group.

The inorganic solid electrolyte may be a lithium nitride, a lithium halide, or a lithium sulfate, for example, $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium secondary battery according to one or more embodiments may be manufactured using a common method known in the art, for example, by injecting the electrolyte between the positive electrode and the negative electrode.

The positive electrode, the negative electrode, and separator as described above may be wound or folded, and then sealed in a battery case. Subsequently, the electrolyte may be injected into the battery case, and the battery case may then be sealed with a cap assembly, to thereby complete the manufacture of a lithium secondary battery. For example, the battery case may be a cylindrical type, a rectangular type, or a thin-film type.

The lithium secondary battery according to one or more embodiments may be classified as a winding type or a stack type, according to the type of electrodes. The lithium secondary battery according to one or more embodiments may be classified as a cylindrical type, a rectangular type, a coin type, or a pouch type depending on the type of casing.

A method of manufacturing the lithium secondary battery according to one or more embodiments is widely known in the art, and thus a detailed description thereof will be omitted.

In accordance with an aspect of the disclosure, a battery module includes a lithium secondary battery according to any of the above-described embodiments as a unit cell.

In accordance with another aspect of the disclosure, a battery pack includes the battery module.

In accordance with another aspect of the disclosure, a device includes the battery pack. The device may be, for example, power tools actuated by electric motors; electric vehicles (EVs), including hybrid electric vehicles (HEVs), plug-in hybrid electric vehicles (PHEV), and the like; electric two-wheeled vehicles, including electric bicycles and electric scooters; electric golf carts; or power storage systems. However, embodiments are not limited thereto.

The lithium secondary battery according to one or more embodiments may be used for various purposes under high-power, high-voltage, and high-temperature operating conditions.

One or more embodiments of the present disclosure will now be described in detail with reference to the following examples. However, these examples are only for illustrative purposes and are not intended to limit the scope of the one or more embodiments of the present disclosure.

EXAMPLES

Example 1

Preparation of Positive Electrode $Li_{1.02}Ni_{0.88}Co_{0.10}Mn_{0.02}O_2$ as a positive active material, carbon black (available from Cabot Corporation) as a conducting agent, and PVdF as a binder were added in a weight ratio of about 95:2.5:2.5 to N-methylpyrrolidone (NMP) and dispersed by mixing, and a loading of 42 mg/cm² of the resulting mixture was dispersed and coated on each of opposite surfaces of an aluminum foil having a thickness of 15 μm, dried, and then roll-pressed to prepare a positive electrode having an electrode density of about 3.6 g/cc. The positive electrode had a current density of about 4.4 amperes per square decimeter (A/dm²).

Preparation of Negative Electrode

BT_MGS_P #7 (a negative active material designed to exhibit a specific capacity of 1300 mAh/g by dispersing Si particles having a size of about 100 nm on graphite and coating carbon thereon) and gum arabic (GA) binder were added to water in a weight ratio of about 96:4 and dispersed by mixing, and the mixture was coated on opposite surfaces of a copper foil having a thickness of 8 μm at a loading level of 14.88 mg/cm² per each surface, dried, and then roll-pressed to prepare a negative electrode having an electrode density of 1.65 g/cc. The negative electrode had a current density of about 3.4 A/dm².

Preparation of Electrolyte

An electrolyte was prepared by adding about 1.5 wt % of vinylene carbonate (VC) and about 1 wt % of Compound 2-1, each based on a total weight of the electrolyte, into a mixed solvent of FEC/EC/EMC/DMC (in a volume ratio of 3:10:17:70) including 1.15M $LiPF_6$.

Compound 2-1

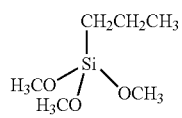

2-1

Manufacturing of Lithium Secondary Battery

A lithium secondary battery was manufactured by injecting the electrolyte into a separator having a thickness of about 16 μm, the separator being composed of polypropylene and interposed between the positive electrode and the negative electrode.

Example 2

A lithium secondary battery was manufactured in the same manner as in Example 1, except that the electrolyte was prepared by adding about 1 wt % of Compound 2-2, instead of Compound 2-1.

Compound 2-2

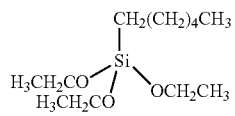

2-2

Example 3

A lithium secondary battery was manufactured in the same manner as in Example 1, except that the electrolyte was prepared by adding about 1 wt % of Compound 2-3, instead of Compound 2-1.

Compound 2-3

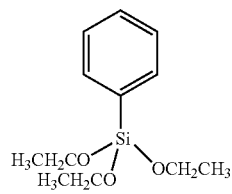

2-3

Example 4

A lithium secondary battery was manufactured in the same manner as in Example 1, except that the electrolyte was prepared by adding about 1 wt % of Compound 2-4, instead of Compound 2-1.

Compound 2-4

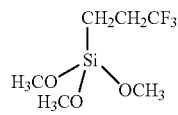

2-4

Example 5

A lithium secondary battery was manufactured in the same manner as in Example 1, except that the electrolyte was prepared by adding about 1 wt % of Compound 2-5, instead of Compound 2-1.

Compound 2-5

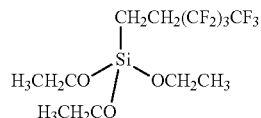

2-5

Example 6

A lithium secondary battery was manufactured in the same manner as in Example 1, except that the electrolyte was prepared by adding about 1.5 wt % of vinylene carbonate (VC) and about 1 wt % of Compound 2-6, instead of Compound 2-1, each based on a total weight of the electrolyte, into a mixed solvent of FEC/EC/EMC/DMC (in a volume ratio of 5/20/35/40) including 1.3M $LiPF_6$.

Compound 2-6

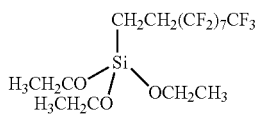

Comparative Example 1

A lithium secondary battery was manufactured in the same manner as in Example 1, except that the electrolyte was prepared by adding about 1 wt % of Compound A, instead of Compound 2-1.

Compound A

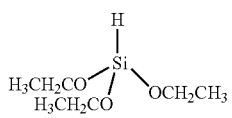

Comparative Example 2

A lithium secondary battery was manufactured in the same manner as in Example 1, except that the electrolyte was prepared by adding about 1 wt % of Compound B, instead of Compound 2-1.

Compound B

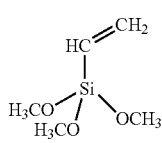

Example 7

Preparation of Positive Electrode $Li_{1.02}Ni_{0.88}Co_{0.10}Mn_{0.02}O_2$ as a positive active material, carbon black (L-CNT/ECP) as a conducting agent, and PVdF as a binder were added in a weight ratio of about 97.8:1.1:1.1 to N-methylpyrrolidone (NMP) and dispersed by mixing, and 33 mg/cm² of the resulting mixture was dispersed and coated on each of opposite surfaces of an aluminum foil having a thickness of 15 μm, dried, and then roll-pressed to prepare a positive electrode having an electrode density of about 3.6 g/cc. The positive electrode had a current density of about 4.45 A/dm².

Preparation of Negative Electrode

BT_MGS_P #7 (negative active material designed to exhibit a capacity of 1300 mAh/g by dispersing Si particles having a size of about 100 nm on graphite and coating carbon thereon) and a GA binder were added to water in a weight ratio of about 95:5 and dispersed by mixing, and the resulting mixture was coated on each of opposite surfaces of a copper foil having a thickness of 8 μm to have 17.77 mg/cm² of surface density. Then, a copper foil with the resulting mixture thereon was dried, and roll-pressed to prepare a negative electrode having an electrode density of 1.65 g/cc. The negative electrode had a current density of about 4.4 A/dm².

Preparation of Electrolyte

An electrolyte was prepared by adding about 1.5 wt % of vinylene carbonate (VC) and about 1 wt % of Compound 2-5, each based on a total weight of the electrolyte, into a mixed solvent of FEC/EC/EMC/DMC (in a volume ratio of 3:10:17:70) including 1.15 molar (M) $LiPF_6$.

Compound 2-5

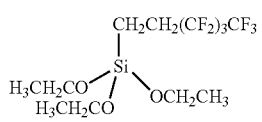

Example 8

A lithium secondary battery was manufactured in the same manner as in Example 7, except that the electrolyte was prepared by adding about 0.1 wt % of Compound 2-5, instead of about 1 wt %.

Example 9

A lithium secondary battery was manufactured in the same manner as in Example 7, except that the electrolyte was prepared by adding about 3 wt % of Compound 2-5, instead of about 1 wt %.

Example 10

A lithium secondary battery was manufactured in the same manner as in Example 7, except that the electrolyte was prepared by adding about 5 wt % of Compound 2-5, instead of about 1 wt %.

Comparative Example 3

A lithium secondary battery was manufactured in the same manner as in Example 7, except that the electrolyte was prepared without addition of Compound 2-5.

Comparative Example 4

A lithium secondary battery was manufactured in the same manner as in Example 7, except that the electrolyte was prepared by adding about 0.05 wt % of Compound 2-5, not about 1 wt %.

Comparative Example 5

A lithium secondary battery was manufactured in the same manner as in Example 7, except that the electrolyte was prepared by adding about 6 wt % of Compound 2-5, instead of about 1 wt %.

Comparative Example 6

Preparation of Positive Electrode $Li_{1.02}Ni_{0.79}Co_{0.13}Mn_{0.08}O_2$ as a positive active material, carbon black (available from Denka Corporation) as a conducting agent, and PVdF as a binder were added in a weight ratio of about 92:3.9:4.1 to N-methylpyrrolidone (NMP) and dispersed by mixing, and a loading of 38 mg/cm² of the resulting mixture was dispersed and coated on each of opposite surfaces of an aluminum foil having a thickness of 12 μm, dried, and then roll-pressed to prepare a positive electrode having an electrode density of about 3.1 g/cc.

Except for use of this positive electrode, a lithium secondary battery was manufactured in the same manner as in Example 7.

Evaluation Example 1: Evaluation of Resistance, Capacity Retention, and Recovery Retention The lithium secondary batteries prepared in Examples 1 to 6 and Comparative Examples 1 and 2 were subject to 200 cycles of charging and discharging (charge/discharge cycles) at a temperature of 25° C. with a charge/discharge current of 0.5 C/1 C, an operating voltage of about 2.8 V to about 4.25 V, and a cut-off current of 1/10C in a CC-CV mode. Then, a direct current internal resistance (DCIR) increase rate, a capacity retention, and a recovery retention of each of the lithium secondary batteries were evaluated. The results are shown in Table 1. Capacity retention was determined by calculating a ratio of the specific capacity after the 200 charge/discharge cycles to the specific capacity after the initial charge/discharge cycle under the same conditions. Recovery retention was determined by calculating a ratio of the recovery capacity (discharge capacity) after 200 charge/discharge cycles to the recovery capacity (discharge capacity) after the initial charge/discharge cycle under the same conditions.

TABLE 1

| Example | DCIR increase rate (%) | Capacity retention (%) | Recovery retention (%) |
| --- | --- | --- | --- |
| Example 1 | 60 | 81.9 | 83.2 |
| Example 2 | 70 | 83.4 | 84.8 |
| Example 3 | 52 | 83.7 | 85.3 |
| Example 4 | 74 | 83.3 | 84.9 |
| Example 5 | 77 | 82.7 | 83.9 |
| Example 6 | 59 | 86.4 | 87.9 |
| Comparative Example 1 | 107 | 79.8 | 53.4 |
| Comparative Example 2 | 84 | 81.6 | 82.9 |

The lithium secondary batteries prepared in Examples 7 to 10 and Comparative Examples 3 to 6 were subject to 200 charge/discharge cycles at a temperature of 45° C. with a charge/discharge current of 1 C/1 C, an operating voltage of about 2.8 V to about 4.25 V, and a cut-off current of 1/10C in a CC-CV mode. Then, a DCIR increase rate, a capacity retention, and a recovery retention of each of the lithium secondary batteries were evaluated. The results are shown in Table 2. Capacity retention was determined by calculating a ratio of the specific capacity after the 200 charge/discharge cycles to the specific capacity after the initial charge/discharge cycle under the same conditions. A recovery retention was determined by calculating a ratio of the recovery capacity after the 200 charge/discharge cycles to the recovery capacity after the initial charge/discharge cycle under the same conditions

TABLE 2

| Example | DCIR increase rate (%) | Capacity retention (%) | Recovery retention (%) |
| --- | --- | --- | --- |
| Example 7 | 22 | 86.5 | 85.0 |
| Example 8 | 21 | 80.3 | 81.2 |
| Example 9 | 29 | 83.7 | 83.2 |
| Example 10 | 32 | 82.3 | 81.2 |
| Comparative Example 3 | 38 | 76.9 | 81.2 |
| Comparative Example 4 | 38 | 77.1 | 78.4 |
| Comparative Example 5 | 39 | 78.0 | 80.0 |
| Comparative Example 6 | 30 | 78.5 | 76.5 |

Referring to Tables 1 and 2, the lithium secondary batteries of Examples 1 to 10 were found to have increased capacity retentions and recovery retentions and considerably lower DCIR increase rates under the same conditions, compared to the lithium secondary batteries of Comparative Examples 3 and 4 including zero or a low content of the trialkoxyalkylsilane compound. The lithium secondary batteries of Comparative Examples 1 and 2 including Compounds A and B, respectively, were found to have relatively high DCIR increase rates, low capacity retentions, and low recovery retentions.

As is evident in Tables 1 and 2, the trialkoxyalkylsilane compound functioned effectively when the Ni-rich lithium metal composite oxide was used.

In conclusion, the lithium secondary batteries of Examples 1 to 10 were found to have improved lifespan characteristics (i.e., high capacity retention and high recovery retention) and at the same time reduced DCIR increase rates.

Without being bound by theory, these results are attributed to the formation of a stable protective layer on the negative electrode surface including graphite by the trialkoxyalkylsilane compound, which consequently may ensure that the negative electrode retains electrochemical characteristics even with repeated charging and discharging cycles.

The lithium secondary battery of Comparative Example 6 using the positive electrode having a lower Ni content (less than 80 mol % of Ni) was found to have a reduced capacity retention and a reduced recovery retention, and an increased DCIR increase rate. These results are attributed to the lower Ni content positive electrode having a relatively stable surface state compared to a Ni-rich positive electrode, and thus the added trialkoxyalkylsilane compound increases resistance and reduces capacity retention and recovery retention.

The lithium secondary battery of Comparative Example 5 including 6 wt % of the trialkoxyalkylsilane was found to have a reduced capacity retention and a reduced recovery retention, and an increased DCIR increase rate. These results are attributed to the trialkoxyalkylsilane compound itself becoming considerably decomposed when used in an amount greater than 5 wt % in the electrolyte, increasing film resistance and lowering battery capacity, storage stability, and cycle characteristics.

As described above, according to the one or more embodiments, lifespan characteristics and resistance characteristics of a lithium secondary battery may be improved by addition of a certain amount of the trialkoxyalkylsilane compound to an electrolyte while using a Ni-rich positive active material for increased capacity.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the FIGURES, it will be understood by those of ordinary skill in the art that various changes in form and details may be made therein without departing from the spirit and scope as defined by the following claims.

What is claimed is:

1. A lithium secondary battery comprising:
a positive electrode;
a negative electrode; and
an electrolyte between the positive electrode and the negative electrode,
wherein the positive electrode comprises a positive active material represented by Formula 1,
the electrolyte comprises a lithium salt, a non-aqueous solvent, and a trialkoxyalkylsilane compound represented by Formula 2, and
an amount of the trialkoxyalkylsilane compound in the electrolyte is about 0.1 weight percent to about 5 weight percent based on a total weight of the electrolyte:

Formula 1

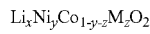
$Li_xNi_yCo_{1-y-z}M_zO_2$

Formula 2

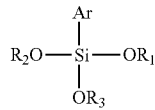

wherein, in Formula 1,
$0.9 \leq x \leq 1.2$, $0.8 \leq y \leq 0.95$, $0 \leq z < 0.2$, and $0 < 1-y-z < 0.2$; and M is at least one of Al, Mg, Mn, Fe, Cr, V, Ti, Cu, B, Ca, Zn, Zr, Nb, Mo, Sr, Sb, W, and Bi, and
in Formula 2,
$R_1$ to $R_3$ are each independently a substituted or unsubstituted $C_1$-$C_{30}$ alkyl group;
Ar is a substituted or unsubstituted $C_3$-$C_{30}$ alkyl group, a substituted or unsubstituted $C_3$-$C_{60}$ cycloalkyl group, or a substituted or unsubstituted $C_6$-$C_{60}$ aryl group; and
a substituent of the substituted $C_1$-$C_{30}$ alkyl group, the substituted $C_3$-$C_{30}$ alkyl group, the substituted $C_3$-$C_{60}$ cycloalkyl group, or the substituted $C_6$-$C_{60}$ aryl group is independently a halogen atom, a methyl group, an ethyl group, a propyl group, an isopropyl group, an n-butyl group, an isobutyl group, a t-butyl group, a trifluoromethyl group, a tetrafluoroethyl group, a vinyl group, a propenyl group, or a butenyl group.

2. The lithium secondary battery of claim 1, wherein the amount of the trialkoxyalkylsilane compound is about 0.1 weight percent or greater to about 3 weight percent or less based on the total weight of the electrolyte.

3. The lithium secondary battery of claim 1, wherein Ar is a fluorine-substituted $C_3$-$C_{30}$ alkyl group.

4. The lithium secondary battery of claim 1, wherein Ar is a propyl group, an isopropyl group, an n-butyl group, an isobutyl group, a sec-butyl group, a tert-butyl group, a pentyl group, a hexyl group, a cyclopentyl group, a cyclohexyl group, or a phenyl group.

5. The lithium secondary battery of claim 1, wherein the trialkoxyalkylsilane compound is a compound represented by one of Formulae 2-1 to 2-6:

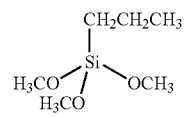

2-1

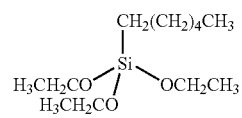

2-2

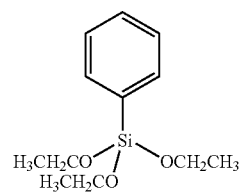

2-3

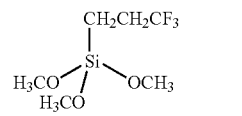

2-4

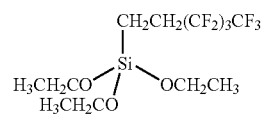

2-5

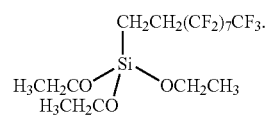

2-6

6. The lithium secondary battery of claim 1, wherein the lithium salt comprises lithium difluoro(oxalato)borate, lithium bis(oxalato)borate, lithium difluoro bis(oxalato) phosphate, $LiBF_4$, $LiPF_6$, $LiCF_3SO_3$, $(CF_3SO_2)_2NLi$, $(FSO_2)_2NLi$, or a combination thereof.

7. The lithium secondary battery of claim 1, wherein the non-aqueous solvent comprises dimethyl carbonate, diethyl carbonate, ethyl methyl carbonate, dipropyl carbonate, methylpropyl carbonate, ethylpropyl carbonate, methyl ethyl carbonate, ethylene carbonate, fluoroethylene carbonate, propylene carbonate, butyl ene carbonate, tetraethyl ene glycol dimethyl ether, or a combination thereof.

8. The lithium secondary battery of claim 7, wherein the non-aqueous solvent comprises the fluoroethylene carbonate.

9. The lithium secondary battery of claim 8, wherein an amount of the fluoroethylene carbonate is about 0.1 weight percent to about 5 weight percent based on a total weight of the non-aqueous solvent.

10. The lithium secondary battery of claim 1, wherein the electrolyte further comprises vinylene carbonate, vinyl ethylene carbonate, maleic anhydride, succinic anhydride, or combination thereof.

11. The lithium secondary battery of claim 10, wherein the electrolyte further comprises about 0.1 weight percent to about 2 weight percent of the vinylene carbonate, the maleic anhydride, or a combination thereof based on a total weight of the electrolyte.

12. The lithium secondary battery of claim 1, wherein, in Formula 1, $0.85 \leq y \leq 0.95$.

13. The lithium secondary battery of claim 1, wherein the positive active material is represented by Formula 3 or Formula 4:

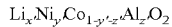  Formula 3

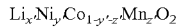  Formula 4 wherein, in Formula 3 and Formula 4, $0.9 \leq x' \leq 1.2$, $0.8 \leq y' \leq 0.95$, $0 < z' < 0.1$, and $0 < 1-y'-z' < 0.2$.

14. The lithium secondary battery of claim 1, wherein the positive active material is $Li_{1.02}Ni_{0.80}Co_{0.15}Mn_{0.05}O_2$, $Li_{1.02}Ni_{0.85}Co_{0.10}Mn_{0.05}O_2$, $Li_{1.02}Ni_{0.88}Co_{0.10}Mn_{0.02}O_2$, $Li_{1.02}Ni_{0.88}Co_{0.08}Al_{0.04}O_2$, $Li_{1.02}Ni_{0.95}Co_{0.025}Mn_{0.025}O_2$, or $Li_{1.02}Ni_{0.95}Co_{0.025}Al_{0.025}O_2$.

15. The lithium secondary battery of claim 1, wherein the negative electrode comprises a negative active material comprising a metal alloyable with lithium, a carbonaceous negative active material, or a combination thereof.

16. The lithium secondary battery of claim 15, wherein the negative active material comprises the metal alloyable with lithium, wherein the metal alloyable with lithium comprises at least one of silicon, a silicon-carbon composite material comprising silicon particles, and $SiO_{a'}$ ($0 < a' < 2$).

17. The lithium secondary battery of claim 16, wherein the silicon particles of the silicon-carbon composite material have an average particle diameter of about 10 nanometers to about 150 nanometers.

18. The lithium secondary battery of claim 16, wherein the silicon-carbon composite material has an average diameter of about 5 micrometers to about 20 micrometers.

19. The lithium secondary battery of claim 1, wherein the lithium secondary battery has a direct current internal resistance increase rate of about 150% or less after 200 cycles of charging and discharging at a temperature of 25° C. under a charge current of 0.5 C, a discharge current of 1 C, an operating voltage of about 2.8 volts to about 4.25 volts, and a cut-off current of 1/10 C in a constant current-constant voltage mode.

20. The lithium secondary battery of claim 1, wherein the lithium secondary battery has a cell volumetric energy density of about 500 watt hours per liter to about 900 watt hours per liter.

* * * * *